United States Patent [19]
Yoshida et al.

[11] Patent Number: 5,832,397
[45] Date of Patent: *Nov. 3, 1998

[54] INTEGRATED WIRING SYSTEMS FOR A VEHICLE CONTROL SYSTEM

[75] Inventors: Tatsuya Yoshida, Urizura-machi; Shigeru Oho, Katsuta, both of Japan

[73] Assignee: Hitachi, Ltd., Japan

[ * ] Notice: The term of this patent shall not extend beyond the expiration date of Pat. No. 5,467,272.

[21] Appl. No.: 539,264

[22] Filed: Oct. 4, 1995

Related U.S. Application Data

[63] Continuation-in-part of Ser. No. 184,443, Jan. 21, 1994, Pat. No. 5,467,272.

[30] Foreign Application Priority Data

Jan. 21, 1993 [JP] Japan ................................. 5-00809

[51] Int. Cl.⁶ .................................................. G06G 7/70
[52] U.S. Cl. .......................... 701/29; 701/33; 701/102; 364/133; 364/132; 340/459; 73/117.3
[58] Field of Search ..................... 364/423.098, 431.04, 364/431.07, 138, 424.045, 925, 940, 424.027, 424.036, 424.037, 424.039, 431.11, 431.12, 551.01, 431.011; 123/339, 337, 609, 416, 417, 419, 618, 501, 481; 340/825.52, 825.07, 825.22, 825.06, 459, 438; 73/117.3, 117.2

[56] References Cited

U.S. PATENT DOCUMENTS

| | | |
|---|---|---|
| 4,730,256 | 3/1988 | Niimi et al. ........................ 364/431.12 |
| 4,804,937 | 2/1989 | Barbiaux et al. ................... 364/424.04 |
| 4,843,557 | 6/1989 | Ina et al. ............................ 364/431.11 |
| 4,924,391 | 5/1990 | Hirano et al. ..................... 364/424.038 |
| 5,012,414 | 4/1991 | Ishii et al .......................... 364/424.034 |
| 5,038,289 | 8/1991 | Abe .................................... 364/430.01 |
| 5,053,964 | 10/1991 | Mister et al. ..................... 364/424.024 |
| 5,077,670 | 12/1991 | Takai et al. ...................... 364/424.034 |
| 5,138,548 | 8/1992 | Kienle ................................ 364/431.12 |
| 5,189,617 | 2/1993 | Shiraishi .......................... 364/423.098 |
| 5,224,124 | 6/1993 | Hamano et al. .................. 364/424.027 |
| 5,278,759 | 1/1994 | Berra et al. ...................... 364/423.098 |
| 5,284,116 | 2/1994 | Richeson, Jr. ..................... 364/431.12 |
| 5,369,581 | 11/1994 | Ohsuga et al. ..................... 364/431.08 |
| 5,467,272 | 11/1995 | Yoshida et al. .................... 364/431.04 |
| 5,481,456 | 1/1996 | Oqura .............................. 364/423.098 |
| 5,579,219 | 11/1996 | Mori et al. ........................ 364/431.12 |

*Primary Examiner*—Jacques H. Louis-Jacques
*Attorney, Agent, or Firm*—Evenson, McKeown, Edwards & Lenahan, P.L.L.C.

[57] ABSTRACT

An integrated wiring system for controlling multiple vehicle systems comprising a plurality of terminal control units having different information processing speed and a central control unit. A communications interface is provided in the central control unit in the form of a dedicated programmable input/output processor for performing data communication based on a plurality of communication protocols.

35 Claims, 11 Drawing Sheets

SEQUENCE CONTROL MATRIX

| ① HIGH SPEED | ⑤ HIGH SPEED |
|---|---|
| ② INTERMEDIATE SPEED | ⑥ INTERMEDIATE SPEED |
| ③ HIGH SPEED | ⑦ LOW SPEED |
| ④ LOW SPEED | ⑧ |

| | |
|---|---|
| HIGH SPEED | ADR0 |
| INTERMEDIATE SPEED | ADR1 |
| LOW SPEED | ADR2 |

INTEGRATED WIRING SYSTEMS FOR A VEHICLE CONTROL SYSTEM

This application is a continuation-in-part of U.S. patent application Ser. No. 08/184,443 filed Jan. 21, 1994, entitled "Integrated Wiring System," now U.S. Pat. No. 5,467,272.

BACKGROUND OF THE INVENTION

The present invention relates to a communication system for an automobile, particularly to a LAN system for controlling the rigging of an automobile such as head lamps, power windows, power seats, power mirrors, a trunk opener, handling switches thereof and so on, and a total communication and control system for control units such as an A/T (Auto Transmission) control unit, a T/C (Traction Control) unit, an ABS, (Antilock Brake System) control unit, a navigation unit, an engine control unit, a diagnosis control unit, etc.

Conventional communication systems, for example as described in Japanese Patent Laid-Open No. 230345/1984, control the rigging of an automobile using serial multiple data transmission in which one or more bus lines are used in place of many control signal lines. Such communication systems are commonly referred to as Class A systems. Besides Class A automobile communication systems, there are also Class B systems which communicate, for example, with control units for a failure diagnosis system of an engine or an external diagnosis system. Furthermore, automobile communication systems for various kinds of total real time distributed control systems in which a micro-computer control unit such as an engine controller, a transmission controller, a suspension controller, etc., are linked by a signal transmission bus, are classified as Class C. Various kinds of automobile communication systems are reported in detail in SAE Paper No. 920228. Large scale integrated circuit (LSI) techniques are widely used for communication processing for data transmission in automobile communication systems. SAE Paper No. 920228 describes in detail various kinds of communication LSIs used for Class A, B and C automobile communication methods. The conventional techniques of the communication processing devices using an exclusive LSI are summarized below.

In a first conventional technique, an automobile communication system uses ACIA (Asynchronous Communication Interface Adapter) as a communication processing device. A general purpose LSI (for example HD6350 produced by Hitachi Ltd.) is used for ACIA, and is widely used as the communication processing device for communication among personal computers. Various kinds of single-chip microcomputers with built-in ACIA, such as H8/532 (HD6475328 made by Hitachi Ltd.) are recently produced. Because they are less costly, microcomputers with built-in ACIA are widely used for communication processing in automotive communication systems.

Japanese Patent Laid-Open No. 230345/1984 discloses a second conventional technique in which an automobile communication system uses an exclusive LSI as the communication processing device in place of a microcomputer, with the exclusive LSI also performing the load control function. In this system, complex load control cannot be performed because a microcomputer is not used. Such a system is useful only for comparatively simple systems such as power windows, door locks, etc.

In a third conventional technique, an automobile communication system has an exclusive LSI (for example, AN82526 produced by INTEL Company) with the communication processing function performed outside of a microcomputer for communication and control.

A fourth conventional technique uses a microcomputer with a built-in exclusive communication processing function. PCA82C200 produced by PHILIPS Company is an example of such a system in which communication processing is executed in part by the microcomputer.

In a fifth conventional technique described in Japanese Patent Laid-Open No. 230345/1984, an automobile communication system uses both the second and the third technique. A communication and control unit of the system has a central control unit and terminal control units. The central control unit has an exclusive LSI with a communication capability, and a microcomputer which sends instruction signals to the LSI. The terminal control units, which have an exclusive LSI with communication processing capability, control various loads in response to instruction signals from the central control unit, sending data on the state of handling switches to the central control unit, and so on.

In these conventional techniques, use of the microcomputer as the communication and control unit to execute the communication processing function with the terminal control units (in addition to its usual tasks such as generating control data, monitoring the states of the loads and the handling switches, etc.) is likely to hinder the execution of the primary tasks of the microcomputer. That is, the microcomputer cannot execute the primary tasks at the same time that it is processing communications with the terminal control units.

The use of exclusive LSIs, provided inside and outside the communication and control unit, to separately process communications with the terminal control units in response to instruction signals from the microcomputer, has the problem that users must provide an exclusive LSI for each controlled system which performs different procedures, since the procedures executed by an exclusive LSI are fixed in its production step, and are therefore not interchangable in various systems which require different procedures.

Furthermore, in an integrated wiring system such as disclosed in Japanese Patent Laid-Open No. 230345/1984, in which one or several signal transmission lines are substituted for a multiplicity of control signal wires for serial multiplex data transmission of control signals, if various kinds of control (that is, at different speeds) are to be handled by a single communication protocol, a high-speed communication protocol must be employed, and it is thus necessary to apply high-speed information processing not only to tasks which require the high-speed information processing, but also to tasks which can be processed by low-speed information processing as well. Even if different communication ICs are provided for handling a plurality of communication protocols, if the communication ICs are separately controlled, it is impossible to fully simplify the entire wiring.

SUMMARY OF THE INVENTION

One object of the present invention is to provide a LAN control unit that is compatible with various kinds of communication and control system which execute different processes.

This and other objects and advantages are achieved by the LAN control unit according to the present invention, which includes a dedicated subprocessor for communication processing installed in the LAN control unit so that custom designed communication software can be entered therein. In this manner, a flexible LAN system can be established which can be adapted to accommodate particular communication processing requirements in a LAN system to which the control unit is applied.

According to a second feature of the control unit according to the invention, various kinds of exclusive communication processing methods are prepared and stored in a LAN control unit so that one or more communication processing techniques suitable for the object LAN system can be selected. In the case of a single controlled system, one communication processing method is selected and used. If, on the other hand, there are a plurality of object LAN systems, a plurality of communication processing techniques can be alternated in a predetermined sequence and executed in a time sharing manner. In the LAN system according to the present invention, such operation also utilizes the former feature, in which a plurality of communication processing techniques are prepared and stored in the subprocessor and switched by software processing.

In a first embodiment of the invention, an automobile integrated wiring system includes a communication and control unit having the first of the two features described above: that is, a main processor for processing data communicated between the communication and control unit and other elements connected to it through a bus; a memory for storing communication processing procedures; and a dedicated subprocessor for executing communication between the communication and control unit and the other elements in accordance with the communication processing procedures stored in the memory device.

In a second embodiment of the automobile integrated wiring system according to the invention, a memory device is provided for storing various kinds of protocols for communication between the communication and control unit and other elements which are connected to a bus as well as a communication processing device for selecting a protocol from among those stored in the memory device, and for transmitting data between the unit and the other elements in accordance with the protocol.

Since the DMA (Direct Memory Access) technique is used to transfer data to the memory of a main processor in the communication and control unit having a subprocessor, the constitution of an automobile integrated wiring system described in the following is also an example of the present invention.

A third embodiment of the invention includes a communication and control unit having the first feature of the present invention comprising: a main processor for processing data communicated between the communication and control unit and other elements connected to it through a bus; a dedicated subprocessor for processing communications between the unit and the other elements; a memory accessible by both the main processor and the subprocessor for temporarily storing the data transmitted between the unit and the other elements through the subprocessor; and a data transmitting bus for directly transmitting and receiving data between the main processor and the memory device (which are connected with each other through the bus), bypassing the main processor. By using the DMA technique for the main processor memory, the time consumed for storing the data which it uses is reduced, because the data received by the subprocessor can be transferred to the main processor memory, bypassing the main processor itself.

In the automobile integrated wiring system which includes a communication and control unit having the first feature of the present invention, communication processing is executed by the subprocessor and the programs executed therein are stored in a memory device such as an erasable programmable read only memory (EPROM) or an electrically erasable programmable read only memory ($E^2PROM$). By using such memory devices to store programs, the need for fixing of the communication processing procedures in the semiconductor production step can be avoided. That is, the communication processing programs can be stored in the memory device, according to the contents of communication or the hardware system to be used. Furthermore, in the above-mentioned unit, an input/output circuit can be shared by the main processor and the subprocessor through the data bus.

In the automobile integrated wiring system which includes a communication and control unit having the second feature of the present invention, the use of a single communication control unit in combination with memory devices in which a plurality of communication processing procedures are stored, permits the selection of communication processing procedures in accordance with the characteristics and requirements of the computer system or the object system to which the communication and control unit is connected. In this unit, processing for communication between the communication and control unit and the other elements can be realized by means of a microprocessor in accordance with the program selected from among plural programs for the protocols corresponding to various transmitting speeds provided in the previously mentioned memory device. Furthermore, the order in which the programs are performed is predetermined and stored in a table provided in a memory device, and each program is executed by the microprocessor according to the predetermined order. The table in which the above-mentioned program execution order is stored can be provided in the memory device where the above-mentioned programs are stored or in a separate memory device.

Other objects, advantages and novel features of the present invention will become apparent from the following detailed description of the invention when considered in conjunction with the accompanying drawings.

DETAILED DESCRIPTION OF THE DRAWINGS

Figure 1:
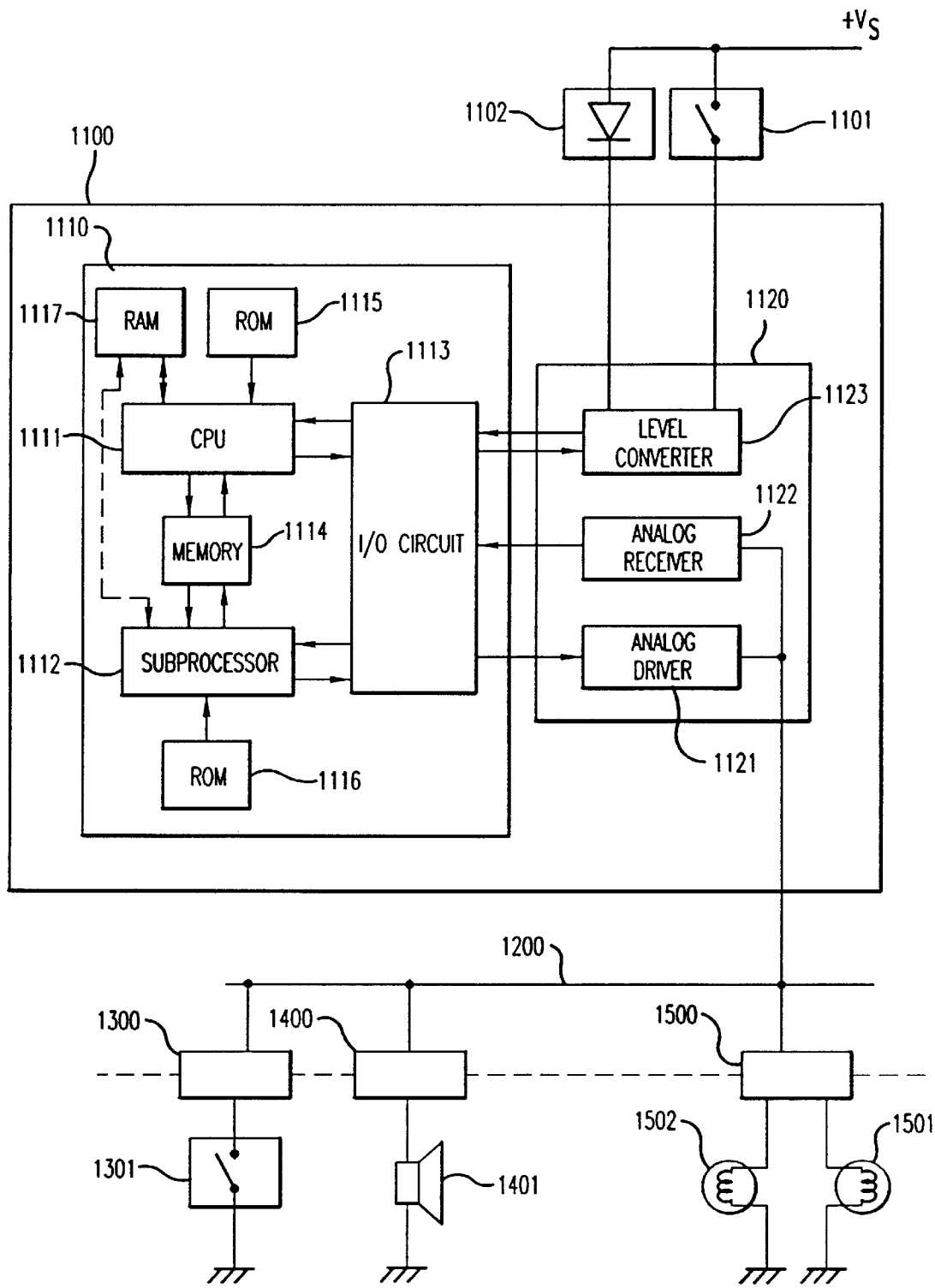
FIG. 1 shows a first embodiment which incorporates the first feature of the invention.

FIG. 1 shows an embodiment of the invention applied to an automobile LAN system for controlling communication with a Class A system corresponding to low transmitting speed. This embodiment is preferably applied to an automobile integrated wiring system for controlling the body rigging such as power windows, power locks, head lights, direction indicators, power seats and so on which are mentioned in Japanese Patent Laid-Open No. 230345/1984 or the SAE Paper No. 920229. In FIG. 1, a central control unit 1100 is connected to terminal control units 1300, 1400 and 1500 through a transmission wire 1200. (The central control unit 1100 and the terminal control unit 1400 are provided at the back of an instrument panel, while the terminal control unit 1300 is in the neighborhood of a steering column, and the terminal control unit 1500 is near the head lights, respectively.) The central control unit 1100 gathers input information concerning the automobile integrated wiring system, such as the states of a key switch 1101 and a head light switch 1301 (transmitted through the wire 1200). Based on the input information, the central control unit 1100 controls all of the output states of the automobile integrated wiring system. That is, the control signal to an indicator 1102 connected to the central control unit 1100 is sent directly, and the control signals to a buzzer 1401 and a head light 1501 are transmitted through the transmission wire 1200. The terminal control units 1300, 1400 and 1500 detect and send information concerning the state of each switch or sensor to the central control unit 1100 and receive the control signals for various kinds of loads from the central control unit 1100 and provide them to the loads.

The central control unit 1100 in FIG. 1 comprises a CPU (Central Processing Unit) 1111 in a microcomputer 1110 (for example, an "Intelligent Sub Processor", model H8/570, HD6475708 produced by Hitachi Ltd.) with a built-in subprocessor 1112, which controls an input/output ("I/O") circuit 1113 independently of the CPU 1111. The H8/570, or an equivalent unit, is referred to as a subprocessor hereinafter. The CPU 1111 can send and receive data to and from the subprocessor 1112 through a common memory 1114, which comprises a general purpose register and a RAM (Random Access Memory). The CPU 1111 and the subprocessor 1112 operate in accordance with programs stored in ROMs (Read Only Memory) 1115 and 1116, respectively.

An analog IC 1120 is provided outside the microcomputer 1110 and connected to the I/O circuit 1113. The analog IC 1120 consists of an analog driver 1121, an analog receiver 1122 and a level converter 1123. The analog driver 1121 and the analog receiver 1122 are connected to a transmission wire 1200. The analog driver 1121 converts the transmission signals from the I/O circuit 1113 to a level suitable for driving the transmission wire 1200 and and removes superfluous high frequency components. The analog receiver 1122 receives signals transmitted on the transmission wire 1200, removes the transmission distortions and converts them to the level at which the I/O circuit 1113 can execute logical processing of the signals. A level converter 1123 converts the switch signals 1101 from the battery voltage $+V_B$ to the voltage level at which the I/O circuit 1113 can execute logical processing, by removing the serge and spike noises generated in the switch signals 1101. It supplies enough current to drive indicator 1102 and turns ON or OFF the indicators corresponding to the output states of the I/O circuit 1113.

Figure 2:
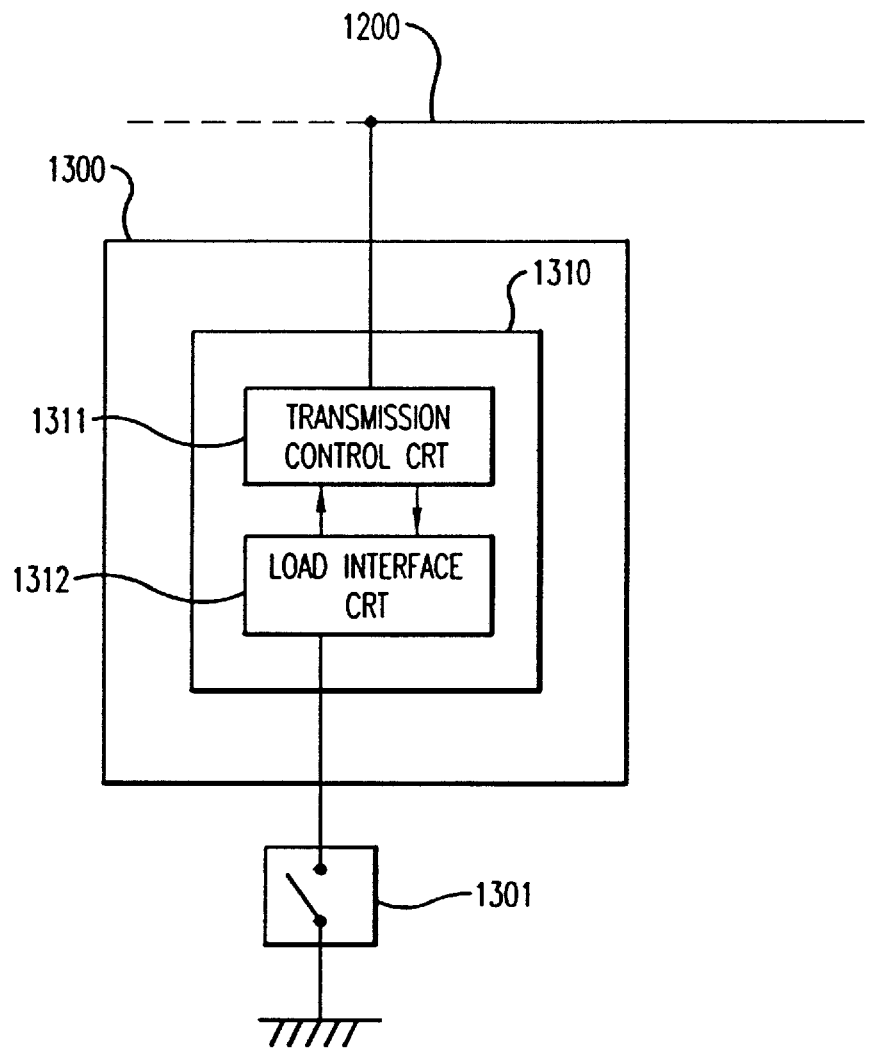
FIG. 2 shows the details of the terminal control unit 1300 in FIG. 1.

The terminal control unit 1300 of FIG. 1, which is described in detail in SAE Paper No. 920229, is shown in FIG. 2. It consists of a transmission LSI 1310 having a transmission control circuit 1311 and a load interface circuit 1312. The terminal control units 1400 and 1500 are the same as the terminal control unit 1300, except that an LSI for sending and receiving two byte data is used for the terminal control unit 1300, while an LSI for four byte data is used for the terminal control unit 1500. In the two byte data of the terminal control unit 1300, the byte is used to express the state of the head light switches, and the other byte, which is the reverse of the former, is used for signal error checking. In the terminal control unit 1500, one byte is used to control the illumination of head lights, while the other controls the fog lamps. The remaining two bytes are the reverse of each of the control bytes.

The operation of the embodiment is explained, for example, with reference to the control of the head lights 1501 and the fog lamps 1502 by the head light switch connected to the terminal control unit 1300. The CPU 1111 operates in accordance with a body control program stored in the ROM 1115 of the microcomputer 1110 of the central control unit 1100 as previously mentioned. The CPU 1111 sends control data for controlling the loads to each terminal control unit and receives monitor data for indicating the states of switches/sensors monitored by each terminal control unit, according to the communication method described in the SAE Paper No. 920229. At first, the central control unit 1100 sends the control data and receives the monitor data to and from a particular terminal control unit selected by the address data which is sent with the control data, and is recognized by the selected terminal control unit itself. The order of communication is stored in the table of the ROM 1115 and, in this embodiment, the terminal control units are selected in sequence. The length of the communicated data (which is two bytes and four bytes in this embodiment) is determined by the length of the data for each terminal control unit stored in the ROM 1115.

Data transmission is performed as follows: first, the CPU 1111 enters the address data and the control data in the common memory 1114, and sends a data transmission command to the subprocessor 1112, which commences data transmission. The transmitted signal waveform series is generated by reference to the address data, the control data and the data length stored in the common memory 1114, and controlling the logical states of the I/O circuit 1113, and is sent to the transmission wire 1200 by the analog driver 1121. The subprocessor 1112 also monitors the communication state of the transmission wire 1200 through the analog receiver 1122 and the I/O circuit 1113 in parallel with the data sending operation. If any discrepancy between the transmitted signal and the monitored signal is detected, it is judged that a transmission error has occurred and a transmission error flag is set at a prescribed place of the common memory 1114. (The length of the data sent to the terminal control unit 1300 is two bytes and that to the terminal control unit 1500 is four bytes in the embodiment.)

If data transmission is completed without error, the subprocessor 1112 commences data receiving. The subprocessor 1112 reproduces the data bit series of the received data, while monitoring the communication states of the transmission wire 1200 through the analog receiver 1122 and the I/O circuit 1113, in the same manner as in data transmission. It writes the received data into the common memory 1114 as the input monitored data after confirming correspondence of the address data, and that no parity errors have occurred, and simultaneously generates the interrupt of signal receiving completion. If a non-correspondence or parity error is detected, a receiving error flag is set at the prescribed place of the common memory 1114. Upon generation of the interrupt of signal receiving completion, the CPU 1111 checks for the receiving error flag, and if none exists, it executes the body control using the received monitored data. (Although the CPU 1111 reads out the received data from the common memory 1114 in this embodiment, if the received data are voluminous, they can be transferred directly from the subprocessor 1112 to the RAM 1117 of the CPU 1111, bypassing the CPU 1111, by using the DMA (Director Memory Access) technique as shown by the dotted line in FIG. 1.

In this embodiment, the state of the head light switch 1301 connected to the terminal control unit 1300 constitutes the monitored data processed by the CPU 1111 as described above. Based on this data, the CPU 1111 sends control data, requiring turning-on or turning-off of the head light 1501 and the fog lamps 1502, to the terminal control unit 1500, and simultaneously controls turning-on or turning-off of the head light state indicator 1102. (The control data are generated so as to turn on only the head lamps 1501 without turning on the fog lamps 1502 if the key switch 1101 is turned off.) The CPU 1111 also sends control data to drive the alarm buzzer 1401 to the terminal control unit 1400 if it is determined that a key has been removed when checking for the states of a key switch 1101. As explained above, in this embodiment, body control processing is executed by the CPU 1111 in accordance with the programs stored in the ROM 1115, and communication processing is performed by the subprosessor 1112 in accordance with the programs stored in the ROM 1116.

Figure 3:
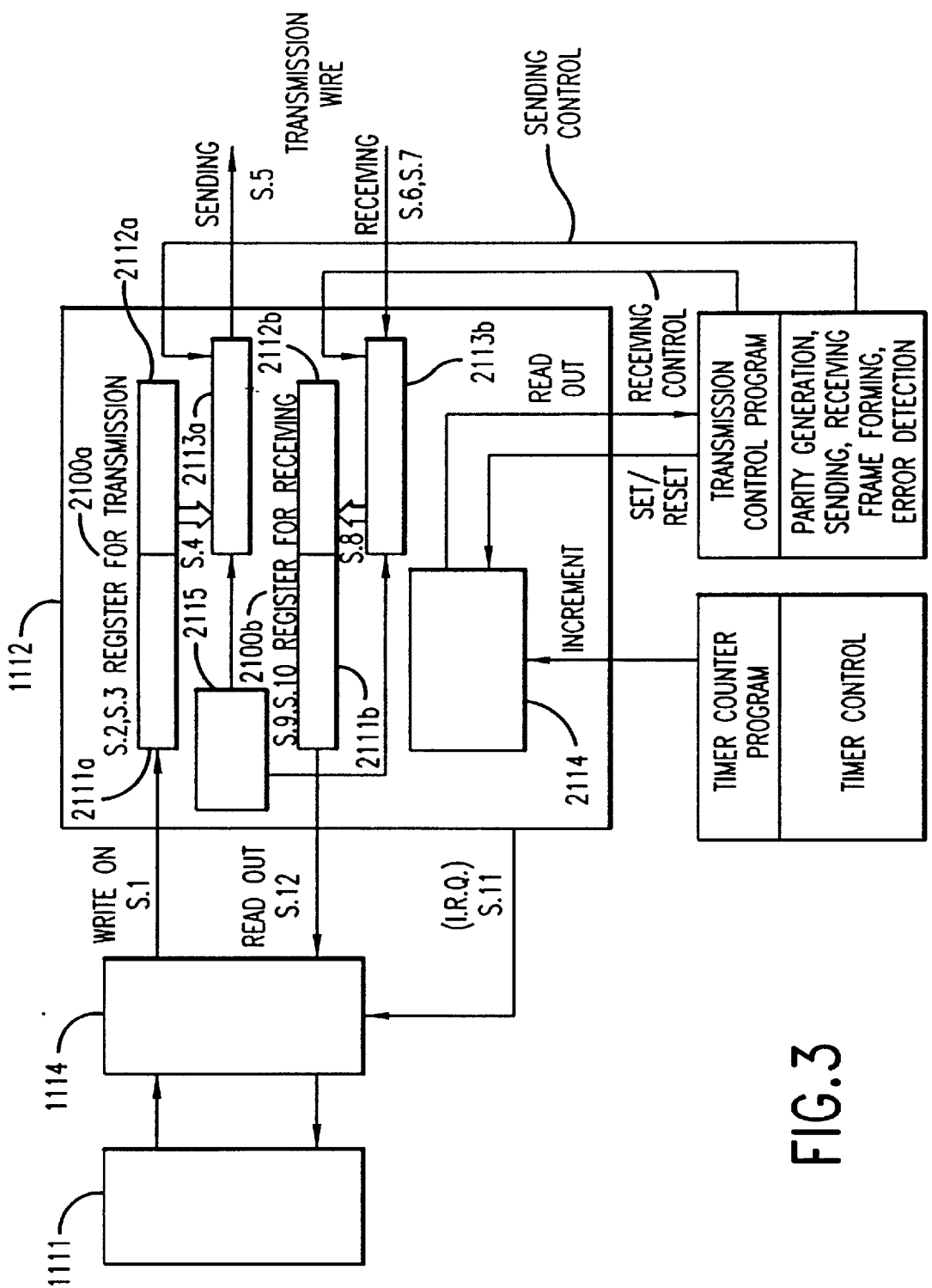
FIG. 3 shows the details of the subprocessor 1112 of FIG. 1.

The configuration and operation of the subprocessor 1112 are shown in FIG. 3. It comprises registers 2111a and 2111b for storing address information for control data to be transmitted and monitored data received, and registers 2112a and 2112b for storing the control data and the monitored data, shift registers 2113a and 2113b for transmitting and receiving data, a register 2114 used as a timer counter, and a register 2115 used for error detection and communication control. The subprocessor 1112 controls data communication by executing a data communication processing program and a timer counting program, using the above-mentioned registers. When the start of data receipt is confirmed, the subprocessor 1112 counts up the register 2114 for the timer counter, detects the transmitted signals at a constant interval, and processes the transmitted bit values of "1" or "0". Upon completion of signal reception, the address of the terminal control unit which sent the data on the one hand, and the sent monitored data on the other, are written into the registers 2111b and 2112b, respectively. If no error is detected, the contents of the registers 2111b and 2112b are read out by the CPU 1111. The address of the terminal control unit to which control data are to be sent, and the control data themselves, are written into the registers 2111a and 2112a, and transferred to the register 2113a, which then starts to send them synchronously with the timer counter. Thereafter, the subprocessor 1112 enters a waiting state.

Since the I/O circuit 1113 is shared by the CPU 1111 and the subprocessor 1112, part of the communication processing can be done, or the communication processing states of the subprocessor 1112 can be monitored by the CPU 1111, in the open time of the main program execution. On the other hand, it is also possible to design the software so that the subprocessor 1112 itself judges the states of the switches 1101, or controls the turning ON/OFF of the indicators 1102. In such case, the CPU 1111 and the subprocessor 1112 exchange the control and the monitored data with each other through the common memory 1114, or by direct data transferring between the subprocessor 1112 and the RAM 1117. By such task sharing of communication processing and component control by the CPU 1111 and the subprocessor 1112, the computation load of the CPU 1111 or the communication reliability can be flexibly improved.

Although the subprocessor 1112 of the central control unit 1100 takes over the central control of communication processing in this embodiment, distributed processing is also applicable to communication processing. For example, the distributed communication processing method by the J1850 communication method of SAE can be applied to the computer system with microcomputers built in both the microcomputers of the central control unit and the terminal control units.

Figure 4A:
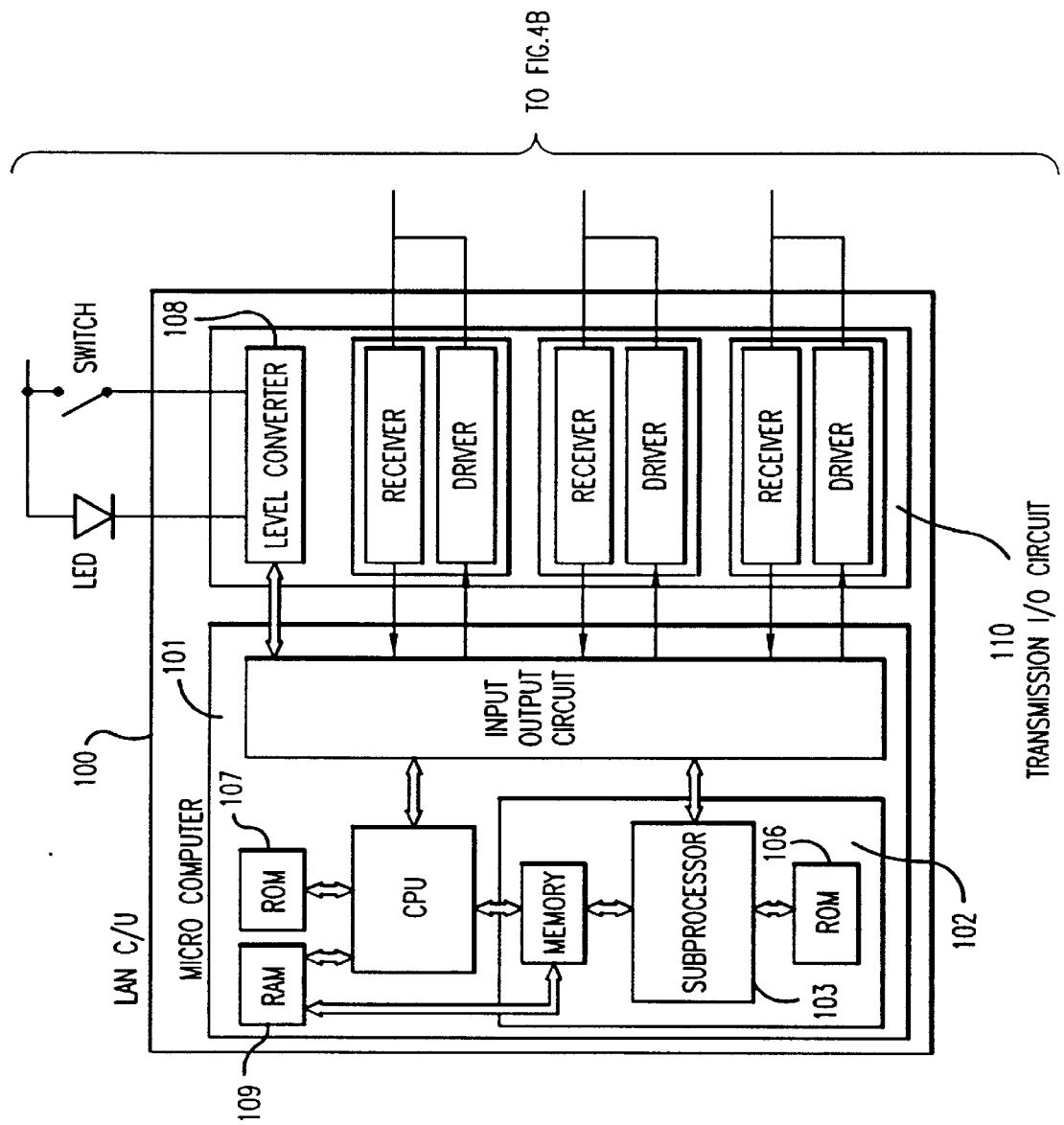
FIG. 4 shows a second embodiment which incorporates the second feature of the invention.
Figure 4B:
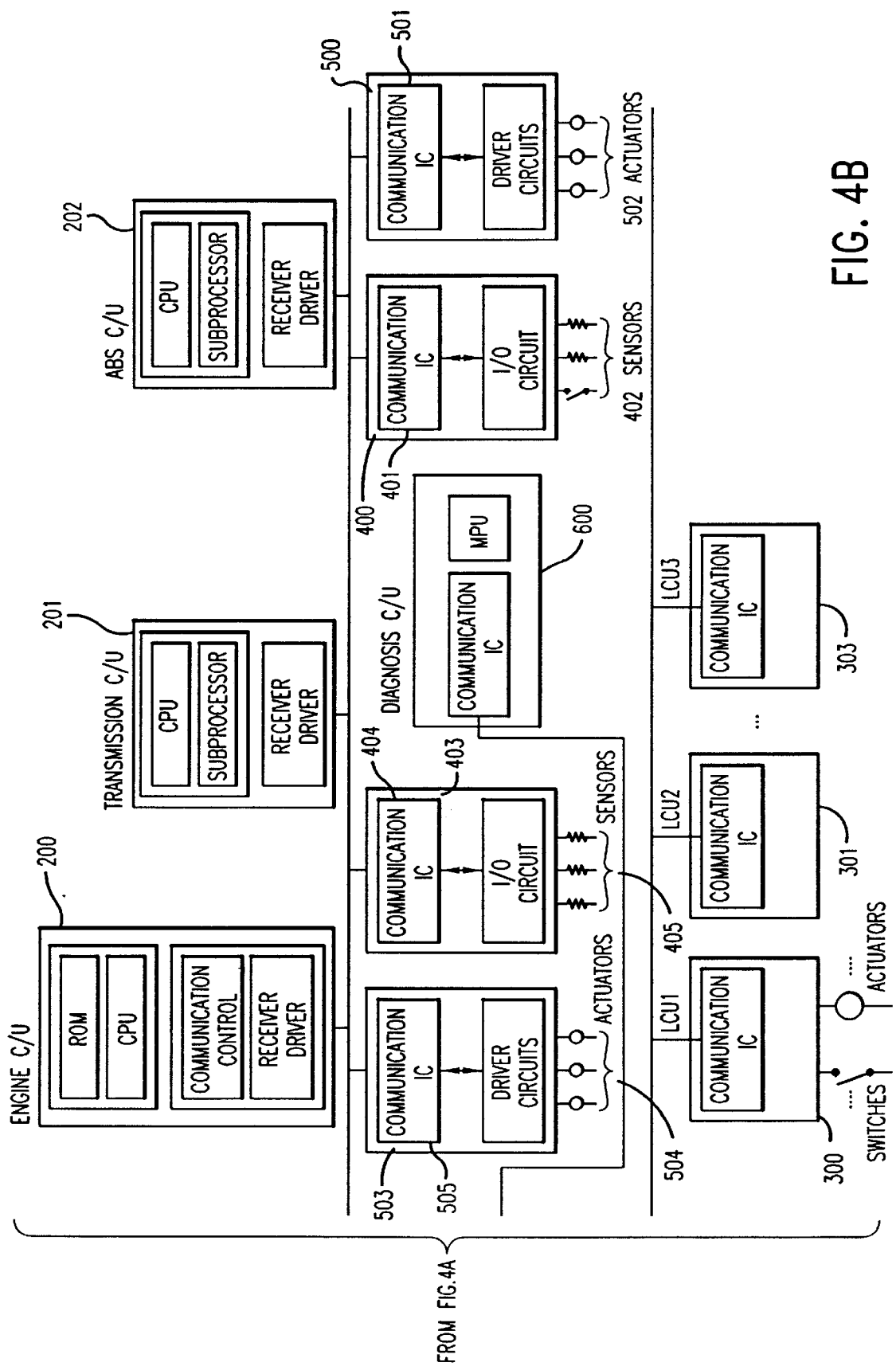

FIG. 4 shows an embodiment of the automobile integrated wiring system which incorporates the second feature of the present invention. It comprises control units for performing various control computations, such as a LAN control unit 100 which serves as a central control unit for performing centralized management of all information, an engine control unit (hereinafter referred to as the "engine c/u") 200 for performing control computations for ignition timing, fuel injection and the like of an internal combustion engine, an automatic transmission control unit (hereinafter referred to as the "A/T c/u") 201 for performing speed change control of a transmission, and an antilock braking system control unit (hereinafter referred to as the "ABS c/u") 202 for controlling brakes. (As noted previously, the latter are Class C (high-speed) controls.) The automobile integrated wiring system also includes sensors 400, 403 and so on for detecting the states of various systems (for example, an intake air sensor for detecting the amount of intake air in the engine, a revolution sensor for detecting the number of revolutions of the engine, and a wheel speed sensor), actuators 500, 503 and so on which operate such systems based on the results of computations performed by the control units using information supplied from the various sensors (for example, an ignition plug, a fuel injection valve and a hydraulic actuator), and local control units (hereinafter referred to as the "LCUs") 300 to 303 which are terminal control units controlled by low-speed Class A information processing.

The LAN c/u 100 has low-speed (Class A), intermediate-speed (Class B) and high-speed (Class C) communication protocols 603 to 605 (FIG. 8) by which it transmits and receives information under centralized control of a microcomputer 101. Computations for Class A control are performed by the microcomputer 101, and the LAN c/u 100 controls the actuators of the LCUs 300–303 based on the results of the computations, as described previously. A plurality of LCUs are provided, each having a nearby switch (for example, a power window switch, a lamp switch and a door opening/closing switch); actuators for electrical parts (for example, power window motors, head lamps, room lamps and door lock motors) are connected to a communication IC within the associated LCU.

For Class A control, the LAN c/u 100 cyclically communicates with the LCUs 1 to n (300–303) using the Class A communication protocol. The LAN c/u 100 receives various input conditions from LCUs 1 to n, performs calculations based thereon and transmits on/off information to each of the LCUs. For example, the LAN c/u 100 receives information indicating that the switch of the LCU 1 has been turned on, performs computations on the basis of that information in accordance with a program stored in a ROM 107, and transmits data to the LCU 2 to turn on its actuator. During actual transmission and reception, the LAN c/u 100 sequentially accesses each of the LCUs, and the received data is stored in an input table in a memory device (RAM), while the data to be transmitted is stored in the output table in a RAM. The CPU performs computations using the information stored in the input table, and stores the result in the output table. The RAM 109 is a memory device for storing the various data such as the control data computed by the CPU, the data received by the communication processing, and so on.

For Class C control, each of the sensors 400, 403, etc., has a sensor and a communication IC; the signal of the sensor is digitized and information is communicated to each control device through a transmission wire. Each of the LAN c/u 100, the engine c/u 200, the A/T c/u 201, the ABS c/u 202 and the like has a computing unit (CPU), and a Class C communication device. Each of the control units, which obtains information required for computations, via the Class C communication protocol at a high speed, is connected by the transmission wire to the sensors and switches (disposed in the vicinity of the control units) to the actuators. Each of the control units, which perform various computations on the basis of such information and transmits on/off control signals to the actuators, has a communication IC; and each actuator is turned on/off in accordance with the transmitted on/off control signals.

A programmable I/O processor 102 for performing communication control based on the various communication protocols set in the LAN control unit will be described below. In the present embodiment, three communication control protocols, each having a respective transmission control program, are provided in the I/O processor 102. The transmission control programs stored in ROM 106 are designed to execute respective communication protocols. Computations on the respective transmission control programs by the CPU are performed completely independently so that the transmission control programs can be executed by parallel processing.

Figures 6, 7, 8:
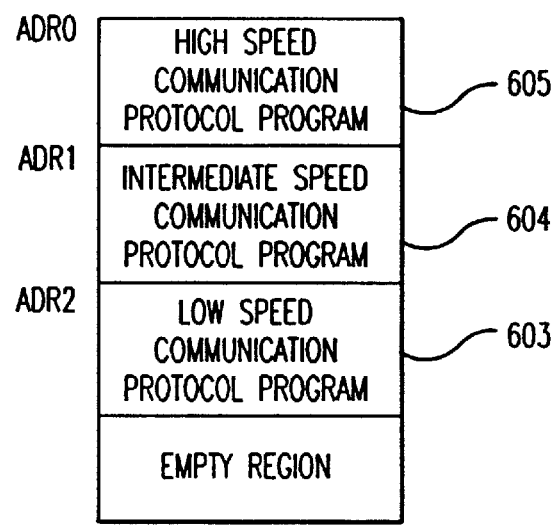
FIG. 6 is an example of a sequence control matrix stored in a register.
FIG. 7 shows an example of contents of an address register.
FIG. 8 shows an example of contents of a program memory.

A table of a sequence control matrix, an address table shown in FIG. 7 and the respective communication protocols are stored in ROM 106 of a subprocessor 103 shown in FIG. 6. Names of functions are stored in the sequence control matrix. When the function of [1] High-speed is selected, the subprocessor 103 refers to the contents of the address register and executes the [1] High-speed program, which is stored in the program memory from the address ADR0 of the register as shown in FIG. 8, and control for the high-speed communication is executed by the subprocessor 103. After the execution of the program for the function of [1] High-speed is finished, the processing is transferred to the function of [2] Intermediate speed, and the processor 103 refers to the address register and executes the program for the function of [2] Intermediate speed.

Figure 5:
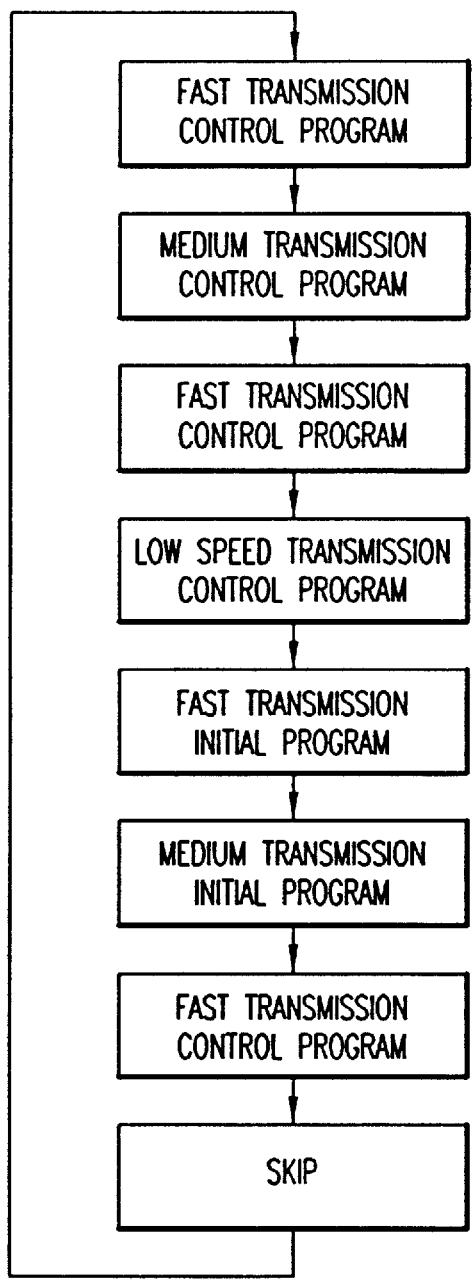
FIG. 5 is a flow-chart which shows an example of a communication control program.

The three transmission control programs are arranged and executed as shown in FIG. 5. The high-speed transmission control program is executed every other step, while the medium-speed transmission control program is executed every four steps, and the low-speed transmission control program is executed every eight steps. That is, at step 301, the high-speed transmission control program is executed, followed by the medium-speed transmission control program at step 302. The high-speed program is then run again, at step 303 and the low-speed program follows at step 304. At step 305, the high-speed program is performed again, followed this time by the medium-speed program once more at step 306. The high-speed program is then performed at step 307. At step 308, a cycle is skipped and the process is repeated. In this manner, the high-speed program is executed every second cycle, while the medium-speed program is executed every fourth cycle, and the low-speed program every eighth cycle.

In each of the communication programs, the data in the transmission shift register 2113a are sent and the data to be received are inputted into the receiving shift register 2113b and stored, as shown in FIG. 3. The CPU of the microcomputer 101 (FIG. 4) reads out data from the registers or writes data into the registers for data transmission and receiving. The I/O processor 102 (FIG. 4) comprises the subprocessor 103, the ROM 106 and a common memory. The transmission I/O circuit 110 includes three sets of a driver, a receiver and a level converter corresponding to the three speed communications. The engine c/u 200, the A/T c/u 201 and the ABS c/u 202 may be subprocessors as in the present embodiment, or a plurality of exclusive control circuits.

Figure 9:
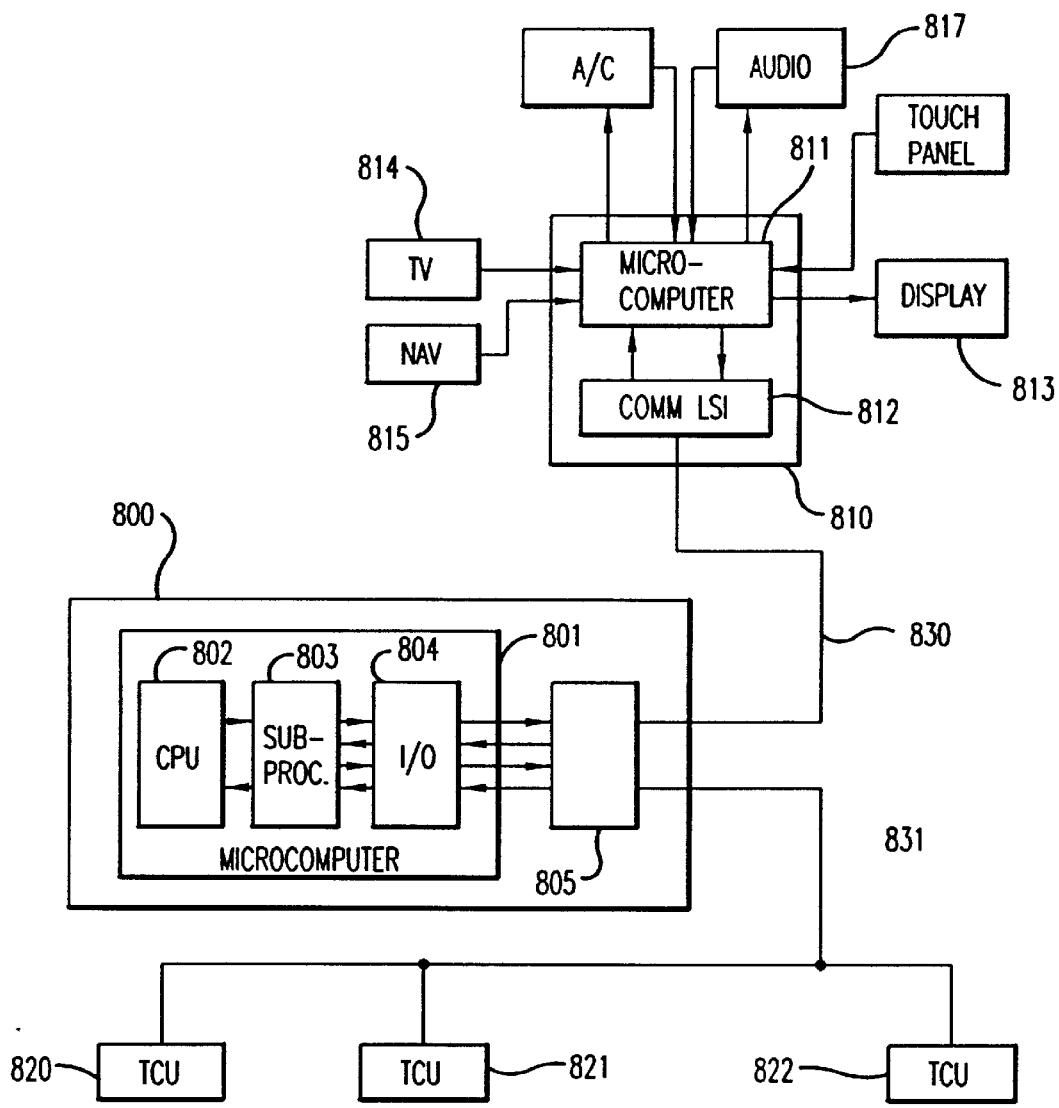
FIG. 9 shows another embodiment of the invention in which two transmission wires are provided and the two communication control programs are executed in parallel.

FIG. 9 shows an example of the application of the present invention to an automobile communication system. A central control unit 800 which has essentially the same constitution as the central control unit 1100 of the first embodiment, is connected to a display control unit 810, and to terminal control units (TCU) 820, 821 and 822 through respective transmission wires 830 and 831. A microcomputer 801 of the central control unit 800 comprises a CPU 802, a subprocessor 803 and an I/O device 804. Since the central control unit 800 in this embodiment drives two transmission wires 830 and 831, it differs from the first embodiment in that two sets of analog drivers and analog receivers are provided in a dedicated transmission IC 805. The display control unit 810 controls a display unit 813, on which are displayed a picture from a television picture receiving circuit 814, a map and a present position of the automobile outputted from a navigation unit 815 and a screen for setting operation menu of an air conditioner 816 and a audio-device 817 by input signals for picture selection. The input signals for picture selection are inputted from a touch panel 818 presented on the screen of the display 813. Furthermore, the states of body control performed by the control signals from the central control unit 800 and the failure state information of electric rigging are also displayed on the display 813. To control the display, the display control unit 810 has a microcomputer 811 and a communication LSI 812, into which are integrated the communication method described in the SAE Paper No. 920229. The terminal control units 820, 821 and 822 have the same function and configuration as each of the terminal control units 1300, 1400 and 1500 of the first embodiment, and operate to control body rigging of the automobile, such as power windows, power locks, head lights, turn signals, power seats and the like. The subprocessor 803 executes the communication program as mentioned in the first embodiment for the two circuits 830, 831 in parallel to communicate with the display control unit 800 and the terminal control units 820, 821, and 822. The same two programs for the communication processing are executed in parallel by the subprocessor 803. The internal memory of the subprocessor 803 is distinguished and used, of course, not confounded by the two programs. With this embodiment, it is possible easily to display the body control states and the failure state information of the electric rigging, since the central control unit 800 is easily connected to the display control unit 810.

Figure 10:
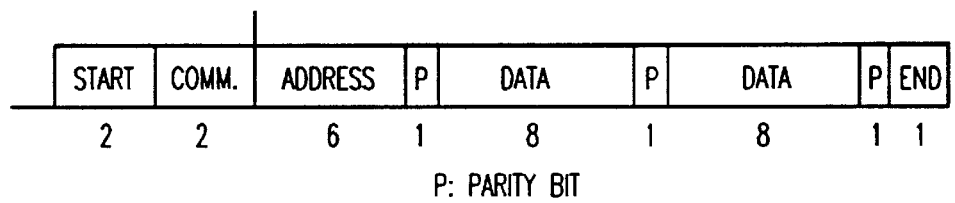
FIG. 10 shows a from format for data transmission according to a Class A protocol.
Figure 11:
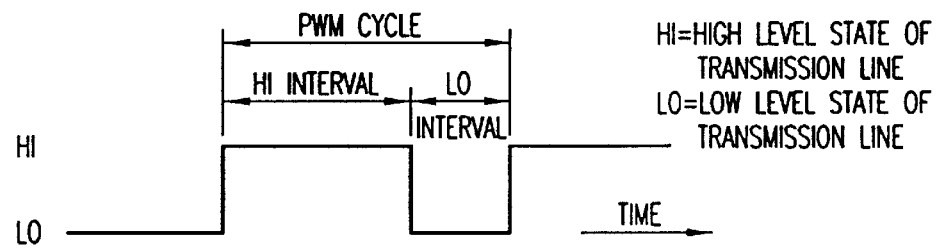
FIG. 11 is a graphic depiction of a single cycle of a PWM encoded signal.

A frame format for the Class A transmission protocol in the above-mention embodiments is shown in FIG. 10. It is composed of start bits (2 bits), command bits (2 bits), address bits (6 bits), data bits (2×8 bits) and an end bit (1 bit). After the address bits and each set of eight data bits, a parity bit is added for detecting data transmission errors. The respective "1" and "0" values in the start bits, the address data and the end bit are encoded by means of PWM (Pulse Width Modulation), and hence the contents of the data are identified by detecting the length of each bit pulse, as shown by FIG. 11. That is, as shown in Table 1, the "0" and "1" values in the start bits and the end bit are distinguished in such PWM encoding by setting different lengths of "HI interval" and "LO interval" within each PWM cycle:

TABLE 1

|  | HI interval | LO interval | PWM cycle |
|---|---|---|---|
| Start | 48 | 24 | 72 |
| Bit 1 | 24 | 12 | 36 |
| Bit 0 | 12 | 24 | 36 |
| End | 0 | 36 | 36 |

Figure 14:
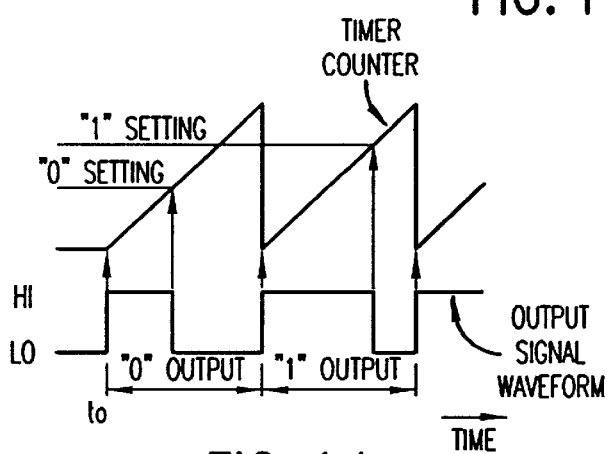
FIG. 14 is a graph which illustrates the PWM encoding process.
Figure 15:
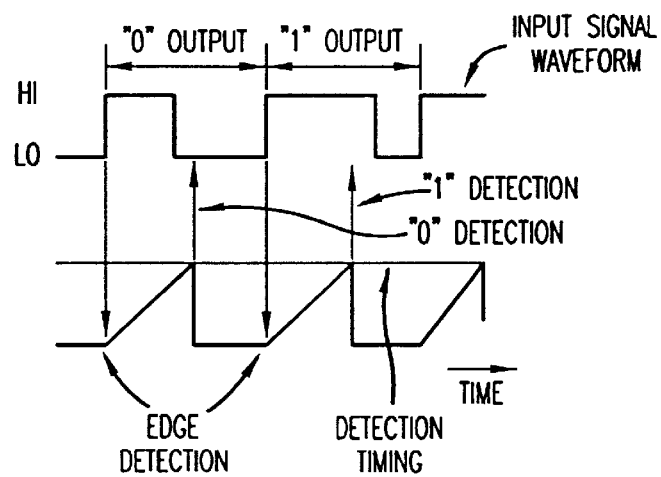
FIG. 15 is a graph which shows the PWM decoding process.

The PWM data encoding and decoding process can best be understood by reference to the Examples in FIGS. 14 and 15. FIG. 14 illustrates the PWM encoding of a two bit signal having the bit values 01. Initially a HIGH level signal (HI) is output in the output signal waveform; at the same time the timer counter is cleared (set to zero) and commences counting. As noted previously, for each PWM cycle the width of the pulse (that is, the duration of the HI level output) depends on whether the input signal for the cycle is at a logical "1" or a logical "0" level, as shown in FIG. 14. (In the example, the input signal is at the 0 level during the first cycle and at the 1 level in the second.) The count contained in the timer counter increases linearly with time, and when it reaches a value equal to the level of the input signal (logical 1 or 0) for the particular cycle, the output signal waveform is switched from HI level to the LO level. When the count in the timer counter reaches a preset value which corresponds to the length of the PWM cycle, the timer counter is reset to zero and the process is repeated. Since the logical 0 level in the first cycle of FIG. 14 is less than the logical 1 level, it can be seen that the output pulse in the first cycle is shorter.

FIG. 15 shows the PWM decoding process applied to the same two bit signal 01. At the beginning of each cycle, the timer counter is set to zero and commences counting. The count is continuously compared with a preset detection timing value and when the two are equal, it is determined whether the input PWM waveform has yet switched from the HI level to the LO level. If it has, a logical 0 is output; if not, a logical 1 is output.

Encoding and decoding of the start bit and the end bit are executed in the manner described.

Figure 12:
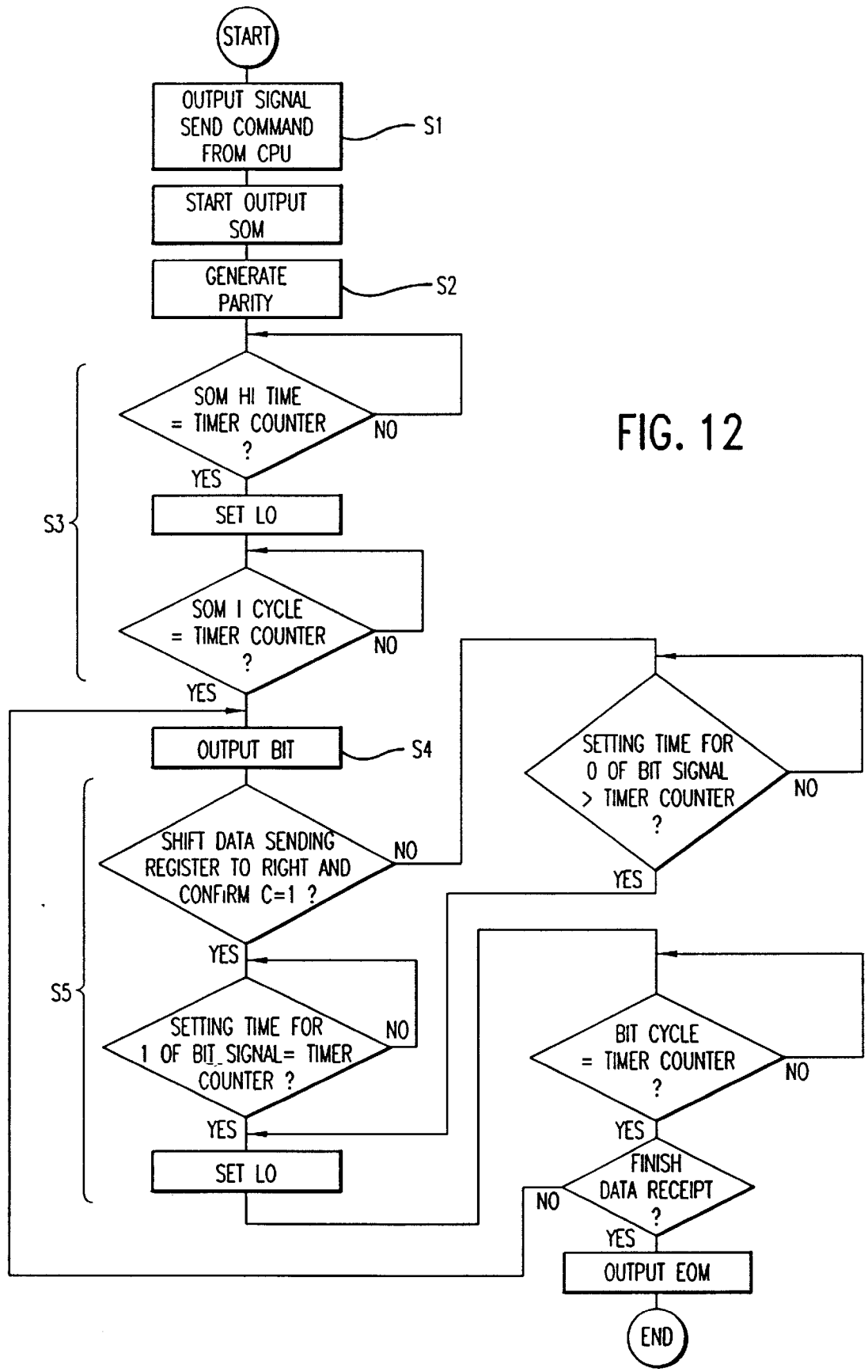
FIG. 12 is a flow chart which shows a protocol for data transmission.

The transmission protocols are executed by software in the subprocessor 1112, which can execute plural programs in parallel by the time sharing method, including operation of a timer counter and the transmission control. The timer counter is a free running timer for counting clock pulses of 200 ns. The transmission control program generates the transmission frame, detects transmission errors and performs PWM encoding (data sending) and PWM decoding (data receiving). The process of generating the transmission protocol is shown in FIG. 12, while the data receiving process is shown in FIG. 13.

The data sending process of the transmission control will now be explained by reference to FIGS. 3 an 12. At the step S.1 the CPU writes a sending address and control data into the transmission register 2100a. At the step S.2, the data of the transmission register 2100a are read out and a parity bit is added to the read out data. At the step of S.3, a frame of the data to be sent is made up. At the step S.4, the read out data to be sent is transferred to the shift register 2113a. Each bit of the data stored in the shift register 2113a is encoded by the PWM encoding method and output in series bit by bit, form the highest order bit.

Figure 13:
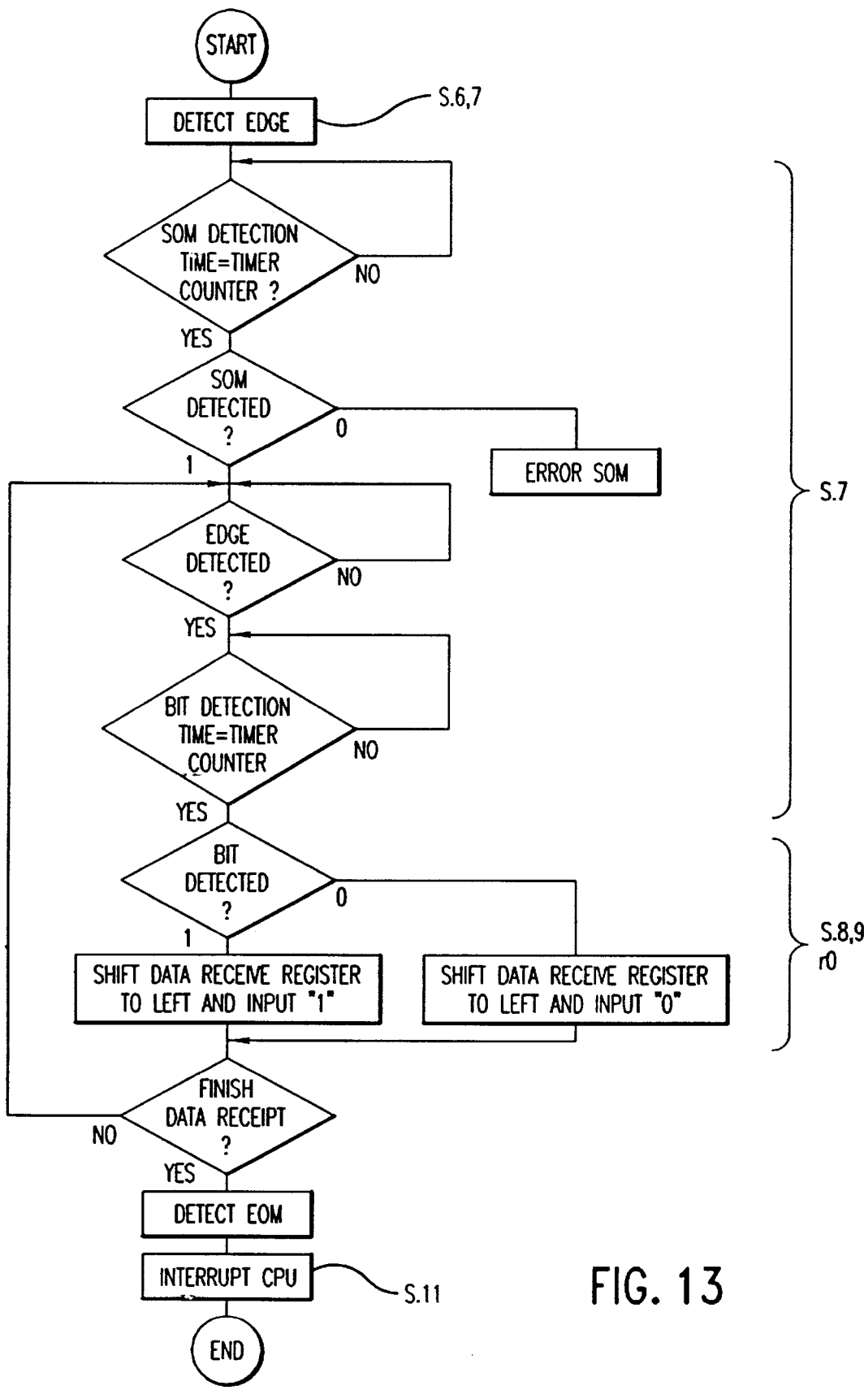
FIG. 13 is a flow chart which shows a protocol for data receipt.

The data receiving process of the transmission control is shown in FIGS. 3 and 13. At the step S.6, the transmission line is monitored (waiting data arrival). Arrival of the start bits is confirmed at step S.7, and they are decoded by the PWM method. The received data are stored in the shift register 2113b. At the step S.8, the data stored in the shift register 2113b are transferred to the receiving register 2100b. At the step S.9, an address and the data contained in the received data frame are read out. At the step S.10, a parity check is made to detect errors. At step S.11, interruption is required to the CUP (at normal receiving operations). At the step S.12, CUP 1111 reads out the receiving address and the data.

In the above-mentioned process steps, the steps S.1 and S.12 are executed by CPU 1111, and the other steps are independently executed by the subprocessor 1112. The data receiving process is continuously executed after completion of a data sending process.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An integrated communications apparatus for use in a vehicle control system for monitoring and controlling operational status of a plurality of vehicle systems, each vehicle system having a local control unit for controlling operation thereof, said local control units being accessible by means of a data communication line, said integrated communications apparatus comprising:

at least one memory unit;

a central processing unit for receiving and processing signals transmitted from said local control units, which signals are indicative of operational status of said plurality of vehicle systems, according to control programs stored in one of said at least one memory unit, and for generating control signals for transmission to said plurality of vehicle systems by means of said data communication line; and a programmable subprocessor for controlling communications between said central processing unit and said local control units by means of said data communication line, according to at least one of said control programs stored in one of said at least one memory unit.

2. The integrated communications apparatus according to claim 1, further comprising a common memory coupled in communication with said central processing unit and with said subprocessor, whereby said central processing unit can send and receive data to and from said subprocessor.

3. The integrated communications apparatus according to claim 2 wherein said at least one memory unit comprises a first memory unit coupled to said central processing unit for storing at least one first program for processing signals received from said local control units and for generating control signals in said central processing unit, and a second memory unit coupled to said subprocessor for storing at least one second program for controlling communications between said integrated communications apparatus and local control units of said vehicle systems.

4. The integrated communications apparatus according to claim 3 wherein said second memory unit comprises an EPROM or an E²PROM.

5. The integrated communications apparatus according to claim 4, further comprising an input/output circuit coupled to said central processing unit and said subprocessor.

6. The integrated communications apparatus according to claim 1 wherein said subprocessor comprises:

first shift register coupled to receive input signals transmitted from said local control units by means of said data communication line;

a receiving register coupled to receive said input signals from said shift register and having an output coupled in communication with said central processing unit;

a transmission register coupled to receive control signals output by said central processing unit; and a second shift register coupled to receive said control signals from said transmission register and to transmit them to said local control units by means of said data communication line;

said first and second shift registers being controlled in response to at least one data communication processing program stored in said at least one memory unit.

7. The integrated communications apparatus according to claim 6 wherein said at least one memory unit has stored therein a plurality of data communication processing programs for controlling communication between said integrated communications apparatus and local control units of said vehicle systems according to a plurality of data communication protocols.

8. The integrated communications apparatus according to claim 7 wherein said at least one memory unit has stored therein a program which controls operation of said data communication processing programs according to a predetermined sequence.

9. The integrated communications apparatus according to claim 8 wherein said plurality of data communication protocols comprises at least a first protocol for transferring signals at a first speed, a second protocol for transferring signals at a second speed and a third protocol for transferring information at a third speed.

10. The integrated communications apparatus according to claim 9 wherein said first speed is a relatively slow speed, said second speed is greater than said first speed, and said third speed is greater than said second speed.

11. The integrated communications apparatus according to claim 10 wherein said predetermined sequence provides for operation of said protocol having said third speed at a repetition rate that is greater than that of said protocols having said second and first speeds and for operation of said protocol having said second speed at a repetition rate that is greater than that of said protocol having said first speed.

12. The integrated communications apparatus according to claim 11 wherein said predetermined pattern provides for operation of said protocols in the following sequence:

third speed second speed third speed first speed third speed second speed third speed pause, which sequence is then repeated.

13. The integrated communications apparatus according to claim 1 wherein said at least one memory unit has stored therein a plurality of data communication processing programs for controlling communication between said integrated communications apparatus and local control units of said vehicle systems according to a plurality of data communication protocols.

14. The integrated communications apparatus according to claim 13 wherein each of said data communication protocols has a different data communication speed.

15. The integrated communications apparatus according to claim 13 wherein said at least one memory unit has stored therein a program which controls operation of said data communication processing programs according to a predetermined sequence.

16. The integrated communications apparatus according to claim 13 wherein said plurality of data communication protocols comprises at least a first protocol for transferring signals at a first speed, a second protocol for transferring signals at a second speed and a third protocol for transferring information at a third speed.

17. The integrated communications apparatus according to claim 1 wherein said plurality of vehicle systems includes a display control unit and at least one system for controlling vehicle body rigging, said apparatus further comprising:

a dedicated transmission integrated circuit coupled to an output of said subprocessor, and having first and second sets of analog drivers and analog receivers;

a first data transmission line connecting said first set of analog driver and analog receiver to said display control unit;

a second data transmission line connecting said second set of analog driver and analog receiver to said at least one system for controlling vehicle body rigging;

wherein said subprocessor executes substantially identical communications processing programs in parallel for controlling communications between said integrated communications apparatus and said display control unit and between said integrated communications apparatus and said at least one system for controlling body rigging, by means of said first and second data transmission lines.

18. The integrated communications apparatus according to claim 17 wherein said at least one system for controlling body rigging includes at least one of power windows, power locks, head lights, turn signals and power seats.

19. The integrated communications apparatus according to claim 17 wherein said display control unit receives and controls display of input signals from at least one of a television receiver and a navigation unit.

20. The integrated communications apparatus according to claim 19 wherein said display control unit controls operation of at least one air conditioner unit and an audio unit by means of a touch panel.

21. The integrated communication apparatus according to claim 1, wherein:

said at least one memory unit comprises at least a first memory unit and a second memory unit;

said control programs by which said central processing unit receives and processes signals transmitted from said local control units are stored in said first memory unit; and said communication processing program by which said programmable subprocessor controls communications between said central processing unit and said local control units is stored in said second memory unit.

22. A method of monitoring and controlling operational status of a plurality of vehicle systems, each having a local control unit for controlling operation thereof, said local control units being accessible by means of a data communication line, said method comprising the steps of:

providing a microprocessor having a central processing unit and a dedicated programmable subprocessor external to said central processing unit;

operating said central processing unit to process signals transmitted from said local control units indicative of operational status of said plurality of vehicle systems, and to generate control signals for transmission to said plurality of vehicle systems, according to control programs stored in a memory; and operating said subprocessor to control communications between said central processing unit and said local control units according to at least one data communication processing program stored in a memory.

23. The method according to claim 22 wherein said at least one data communication processing program may be configured and reconfigured to control communication between said central processing unit and said vehicle systems according to at least one communications protocol which is compatible with said vehicle systems.

24. The method according to claim 23 wherein said plurality of vehicle systems communicate according to a plurality of differing communications protocols and wherein said at least one data communication processing program comprises a plurality of programs, including at least one program which is compatible respectively with each of said communications protocols.

25. The method according to claim 24 wherein said step of operating said subprocessor comprises operating said programs according to a predetermined operating sequence.

26. The method according to claim 25 wherein said predetermined operating sequence can be modified by reprogramming said subprocessor.

27. The method according to claim 25 wherein said predetermined operating sequences provides for operation of said programs in the following sequence:

third speed second speed third speed first speed third speed second speed third speed pause, which sequence is then repeated.

28. An integrated communication apparatus for a vehicle control, said apparatus comprising:

an engine control unit for determining and sending a value for at least one of a plurality of control variables, said plurality of control variables including at least a fuel injection amount and ignition timing, and for controlling at least one system of a vehicle engine;

a transmission control unit for automatically controlling a vehicle transmission;

local control units for controlling vehicle body installations;

a transmission line for transmitting signals among said control units;

a plurality of sensors and actuators connected to said control units via said transmission line; and a transmission input and output device for controlling communication among said control units, sensors and actuators;

wherein transmission of signals for said engine and transmission control units is executed at a faster rate than transmission of signals for said local control units.

29. The intergrated communications apparatus according to claim 28 wherein said transmission input and output device is installed in at least one of said local control units.

30. The integrated communication apparatus according to claim 28, further comprising a diagnosis unit for diagnosing at least one of said control units, wherein:

said transmission input and output device controls communication among said diagnosis and control units, sensors and actuators; and said transmission of signals for said engine and transmission control units is executed at a faster rate than transmission of signals for said diagnosis unit, and transmission of signals for said diagnosis unit is executed at a faster rate than said transmission of signals for said local control units.

31. An integrated communication apparatus for a vehicle control, said apparatus comprising:

local control units for controlling vehicle body installations;

a display control unit for controlling a display device installed in a vehicle; and a transmission line which constantly connects said control units with each other;

wherein control states of said vehicle body installations controlled by said local control units are sent to said display control device and displayed on said display device.

32. An integrated communication apparatus for a vehicle control, said apparatus comprising:

a plurality of control units, including control units having a microcomputer and control units having no microcomputer, wherein signal sending and receiving for said control units having no microcomputer is controlled by at least one of said control units having a microcomputer; and a transmission input and output device for controlling signal transmission for said control units which have a microcomputer at a faster rate than signal transmission for said control unit which have no microcomputer.

33. The integrated communication apparatus according to claim 32 wherein at least one of said control units which have a microcomputer includes a main microcomputer for calculating control signals for said control units which have no microcomputer, and a subprocessor for executing operations of said transmission input and output device.

34. A vehicle integrated siring system having a communication control unit comprising:

a main processor for processing data communicated between said communication control unit and other elements provided in a vehicle via a bus to which said other elements are connected;

at least one memory for storing data processing procedures and communication procedures; and a dedicated programmable subprocessor for executing communication between said communication control unit and said other elements according to at least one of said processing procedures stored in said at least one memory device.

35. A communication control unit for a vehicle integrated wiring system, said communication control unit comprising:
- a main processor for processing data communicated between said communication control unit and other elements provided in a vehicle via a bus to which said other elements are connected;
- at least one memory for storing data processing procedures and communication procedures; and
- a dedicated programmable subprocessor for executing communication between said communication control unit and said other elements according to at least one of said processing procedures stored in said at least one memory device.

* * * * *